United States Patent
Lin et al.

(10) Patent No.: US 11,411,444 B2
(45) Date of Patent: Aug. 9, 2022

(54) VARIABLE RELUCTANCE STEP MOTOR HAVING ENHANCED HOLDING TORQUE

(71) Applicant: Lin Engineering, Inc., Morgan Hill, CA (US)

(72) Inventors: Ted T. Lin, Saratoga, CA (US); JianJun Gan, Shanghai (CN)

(73) Assignee: LIN ENGINEERING, INC., Morgan Hill, CA (US)

( * ) Notice: Subject to any disclaimer, the term of this patent is extended or adjusted under 35 U.S.C. 154(b) by 123 days.

(21) Appl. No.: 17/110,595

(22) Filed: Dec. 3, 2020

(65) Prior Publication Data

US 2022/0021250 A1 Jan. 20, 2022

Related U.S. Application Data

(60) Provisional application No. 63/053,956, filed on Jul. 20, 2020.

(51) Int. Cl.

| | |
|---|---|
| *H02K 37/04* | (2006.01) |
| *H02K 1/14* | (2006.01) |
| *H02K 1/16* | (2006.01) |
| *H02K 37/14* | (2006.01) |
| *H02K 1/17* | (2006.01) |

(52) U.S. Cl.
CPC .............. *H02K 1/146* (2013.01); *H02K 1/16* (2013.01); *H02K 1/17* (2013.01); *H02K 37/04* (2013.01); *H02K 37/14* (2013.01); *H02K 2213/03* (2013.01)

(58) Field of Classification Search
CPC .. H02K 1/17; H02K 1/18; H02K 1/24–1/246; H02K 19/06; H02K 19/103; H02K 19/20–19/24; H02K 37/10
See application file for complete search history.

(56) References Cited

U.S. PATENT DOCUMENTS

| | | | |
|---|---|---|---|
| 3,984,711 | A | 10/1976 | Kordik |
| 3,999,090 | A | 12/1976 | Sinnott |
| 4,286,180 | A | 8/1981 | Langley |
| 4,712,028 | A | 12/1987 | Horber |
| 4,827,164 | A | 5/1989 | Horber |
| 5,059,884 | A | 10/1991 | Shah et al. |
| 5,327,069 | A | 7/1994 | Radun et al. |

(Continued)

FOREIGN PATENT DOCUMENTS

| | | | |
|---|---|---|---|
| GB | 2454171 A1 | 5/2009 | |
| WO | WO2020162828 A1 | 8/2020 | |

*Primary Examiner* — Ramon M Barrera
(74) *Attorney, Agent, or Firm* — Mark Protsik; Thomas Schneck

(57) ABSTRACT

A variable reluctance stepper motor comprises a stator and a rotor that is rotatable relative to the stator. The stator comprises an annular outer yoke with a set of circumferentially spaced stator poles at equal angular intervals around the yoke extending radially inward from first portions of the yoke toward the rotor. Phase windings are individually coiled around each of the respective stator poles. Multiple slots are formed in an outer perimeter edge of the yoke at second portions thereof circumferentially situated between the first portions. A permanent magnet is embedded within each slot with circumferentially directed magnetic orientation of the respective permanent magnets. The remote placement of the magnets ensure that detent torque is kept to a minimum, while also increasing holding and dynamic torque levels.

12 Claims, 5 Drawing Sheets

(56) References Cited

U.S. PATENT DOCUMENTS

| | | |
|---|---|---|
| 5,455,473 A | 10/1995 | Lipo et al. |
| 5,672,925 A | 9/1997 | Lipo et al. |
| 5,780,949 A | 7/1998 | Li |
| 5,825,112 A | 10/1998 | Lipo et al. |
| 2010/0170741 A1 | 7/2010 | Yamashita |
| 2011/0156506 A1 | 6/2011 | Zhao |
| 2011/0181135 A1 | 7/2011 | Pollock et al. |

VARIABLE RELUCTANCE STEP MOTOR HAVING ENHANCED HOLDING TORQUE

CROSS-REFERENCE TO RELATED APPLICATION

This application claims priority under 35 U.S.C. 119(e) from U.S. provisional application 63/053,956, filed Jul. 20, 2020.

TECHNICAL FIELD

The present invention relates to step motors, stepping motors or stepper motors (in which the rotor rotates step by step), more specifically to stepper motors of the variable reluctance type. In particular, the invention relates to details of the stator portion of the motor's magnetic circuit with special attention being given to the torque characteristics of such motors.

BACKGROUND ART

There have been many designs introduced in the motor industry to reduce motor un-energized detent torque in stepper motors for smooth operation. For instance, varying the stator pitch angles is the most common way to reduce detent torque, and thus to reduce noise and vibration. However, in every hybrid stepper the magnetic coupling between the stator and the rotor creates a natural detent torque that is almost impossible to be eliminated.

FIG. 1 shows a conventional stator for variable reluctance (VR) steppers. The illustrated stator is for a VR stepper embodiment that has eight stator poles with six teeth each for a total of 48 stator teeth. Dashed lines show a uniform 45° center-to-center circumferential separation of the stator poles. A corresponding winding diagram for such a VR stepper is shown in FIG. 2. There are no permanent magnets in a conventional VR stepper design. And because no permanent magnets are used, the VR stepper has no detent torque. However, the VR stepper can generate only 60% of the holding torque of the hybrid stepper.

In U.S. Pat. No. 3,984,711, Kordik describes a variable reluctance step motor in which permanent magnets that are magnetized in a circumferential direction are interposed in the spaces between stator pole pieces. The magnetic flux produced by each permanent magnet resists the leakage of the winding-produced flux along paths exclusive of the rotor so as to increase both dynamic and holding torque.

In U.S. Pat. No. 4,286,180, Langley describes a variable reluctance stepper motor (in both linear and rotary embodiments) that has two stator poles with sets of stator teeth, wherein each stator pole includes an annular permanent magnet in addition to its phase windings in order to produce a more efficient motor.

In U.S. Pat. No. 5,327,069, Radun et al. describe a switched reluctance machine in which the stator has poles (referred to therein as "teeth") that themselves comprise permanent magnets and wound with phase windings.

In U.S. Pat. Nos. 5,455,473 and 5,672,925, Lipo et al. describe variable reluctance machines that are provided with stationary permanent magnets mounted in the stator and/or auxiliary field windings coiled about the stator to generate a "primary" flux intended to limit "secondary" flux due to stator phase windings around the respective stator poles. U.S. Pat. No. 5,780,949 of Li likewise provide auxiliary field windings supplied with constant current to establish a magnetic field that is supplemented or opposed by the variable field from phase windings.

While the addition of permanent magnets or auxiliary field windings to the stator in a variable reluctance stepper motor does indeed increase the motor's holding torque and its dynamic torque, it does so at the expense of also introducing detent torque that a VR motor normally lacks, leading to less smooth stepping motion. An enhanced VR stepper design to improve the holding torque while also keeping the detent torque low is needed.

SUMMARY DISCLOSURE

Understanding the magnetic flux behavior, we have re-designed the stator construction. We have discovered that the positioning of any permanent magnets in the stator is exceedingly important. A variable reluctance (VR) stepper now has a set of slots in the back iron of the stator, as far from the rotor as possible, that is, on the outer perimeter edge. The number of slots equals the number of the stator edge. Into each slot, a permanent magnet bar is inserted to help move the energized Ampere Turns from the stator much faster than a standard VR stepper, while keeping its effect upon detent torque interactions with the rotor as low as possible.

Accordingly, a VR stepper motor, comprising a stator and a rotor that is rotatable relative to the stator, is provided. The rotor is composed of soft magnetic material and has a set of multiple, circumferentially evenly spaced rotor poles extending or projecting radially outward toward the stator. The stator comprises an annular outer yoke. A set of multiple circumferentially spaced stator poles at equal angular intervals around the yoke extend or project radially inward from first portions of the outer yoke toward the rotor. There is a set of energizable conductive phase windings that are individually coiled around each of the respective stator poles.

In this invention, second portions of the annular outer yoke (at locations circumferentially situated between the first portions from which the stator poles inwardly project) have multiple slots formed in an outer perimeter edge of the yoke. A permanent magnet is embedded within each slot with circumferentially directed magnetic orientation of the respective permanent magnets.

DETAILED DESCRIPTION

Figure 3:
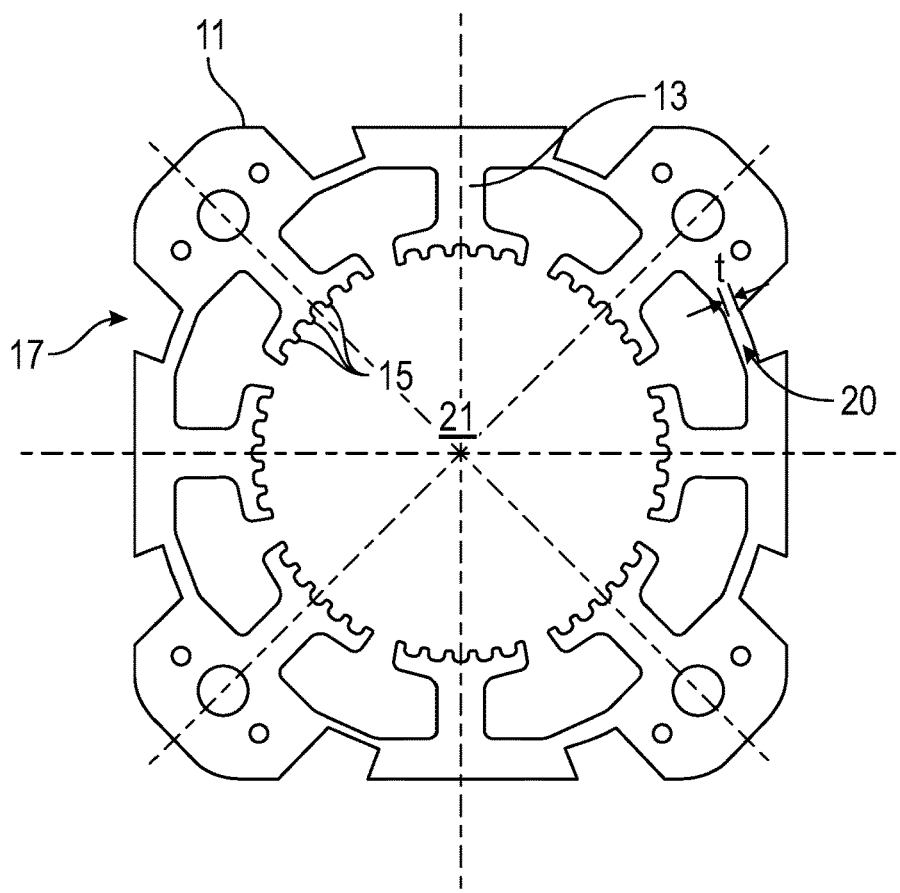
FIG. 3 is a plan view of a stator core in accord with the present invention.

With reference to FIG. 3, a variable reluctance (VR) stepper motor includes a stator core 11 of a soft magnetic material, allowing it be easily magnetized and demagnetized as the stator windings around various stator poles are energized and de-energized in some specified sequence. This is a metallic permeable alloy with an intrinsic coercivity less than 1 kA·m$^{-1}$ and little magnetic remanence, such as any of iron, silicon steel (with up to 3% silicon), moly-permalloy (e.g., 15Fe-80Ni-5Mo), amorphous iron-cobalt, and soft ferrites. Low core losses (such as from eddy currents), high frequency response, and saturation flux density are some factors in the selection, depending upon whether holding torque or switching speed are foremost.

The stator core 11 is typically a laminated structure built up from a stack of thin plates. The back-iron or outer yoke portion of the core is annular, although not necessarily circular in cross-section. For example, in the embodiment shown in FIG. 3, the stator core is seen to be nearly square with beveled corners. A set of multiple, circumferentially spaced stator poles 13 at equal angular intervals extend or project radially inward from the annular outer yoke. In FIG. 3, there are eight (8) such stator poles spaced at 45° circumferential intervals (as seen from the dashed lines radiating from the center of the illustration). In the case of the embodiment in FIG. 3, each of the stator poles 13 terminates at its radially innermost end in a stator shoe having a set of circumferentially spaced stator teeth 15. In other VR stepper embodiments, the poles themselves may be wider and might have neither shoes nor teeth.

Although each of the laminated plates forming the stator core 11 is a unified structure, the back-iron or outer yoke of the stator core can be conceptually divided into (a) first portions from which the stator poles 13 extend radially inward and (b) second portions situated between and connecting those first portions. Such a conception will be helpful in defining the locations of the slots that form a novel aspect of the present invention.

A VR stepper has a set of slots 17 equal in number to that of the stator poles 13 and formed in the back iron of the stator. Thus, a 3-phase VR stepper will have 3n stator poles with 3n slots, while a 4-phase VR stepper will have 4n stator poles with 4n slots, where n is an integer equal to or greater than two. In general, an x-phase VR stepper will have x·n stator poles with x·n slots, where x is equal to or greater than three, and n is equal to or greater than two. For example, as seen in FIG. 3, which shows a representative embodiment of such a VR stepper stator construction, for a 4-phase stepper with eight stator poles 13, the back iron of the stator 11 has eight slots 17 for inserting eight permanent magnets, one for each stator pole 13. The slot dimension, here 2 mm thick and 2.6 mm long, is an example of a 1.8° medium length of a size 42 mm stepper. As usual, a rotor will be inserted into the central region 21 and interact magnetically with the stator pole teeth 15 across a small air gap, typically less than 1 mm.

The slots 17 are formed in the outer perimeter edge of the annular yoke or back iron (furthest from the central rotor region 21) at those locations corresponding to the (conceptual) second portions of the yoke, i.e. adjacent to the winding spaces between the stator poles 13. In FIG. 3, the narrow thickness (t), about 1 mm in this embodiment, of the back iron region 20 at the end of the slots 17 is designed to capture most of the magnetic flux from the magnet bar to minimize the detent torque.

Figure 4:
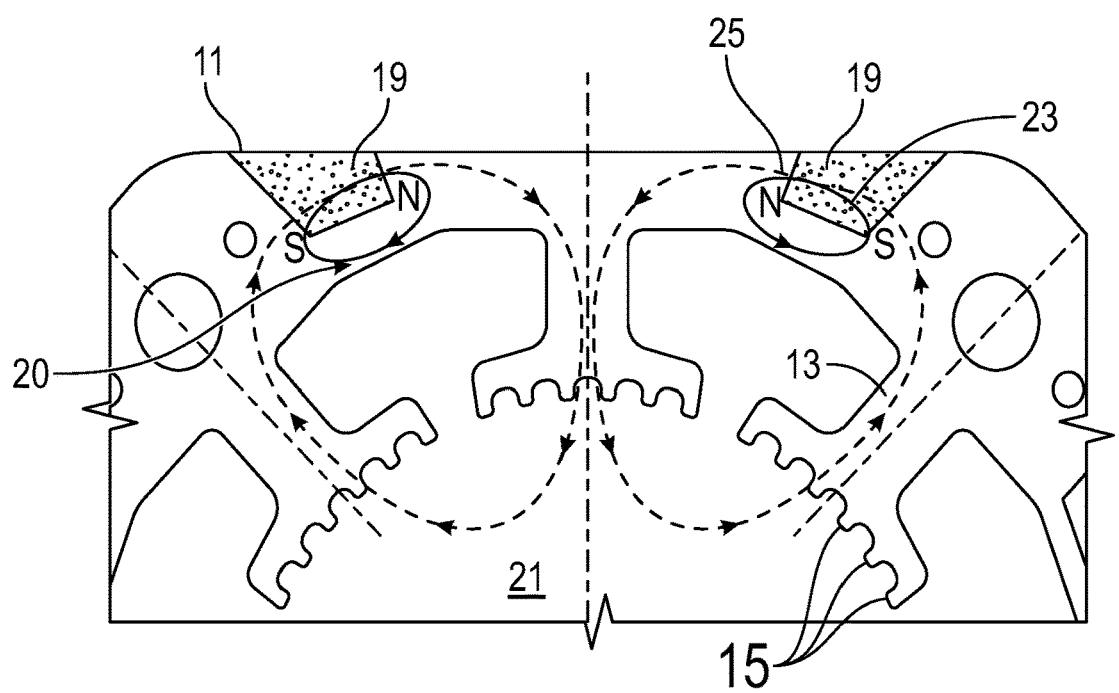
FIG. 4 is a partial close-up view of the stator core of FIG. 3 with permanent magnet inserts.

FIG. 4 shows permanent magnetic flux paths 23 and 25 before any stator windings are energized. The slots in the yoke leave a thin connecting strip 20 of yoke material at an inner edge of the yoke immediately adjacent to a winding volume between the stator poles. This connecting strip of yoke material has a radially thickness of at least 1 millimeter, but the thinner the better, subject to mechanical strength limitations. Most of the flux (about 80% to 90%, seen by the solid lines 23) circulates in the back iron of the stator around the magnet-bar 19 and through the narrow thickness region 20. Only a few leakage fluxes (about 10% to 20%, seen by the dotted lines 25) run through the air gap to the rotor (not shown). The torque generated by this leakage flux 25 is called "Detent Torque". However, because of the location of the permanent magnets 19 in outer perimeter edge slots 17 of the stator core's annular yoke or back iron, which is remote from the central rotor location, this leakage flux 25 is minimized and the detent torque is kept as small as possible.

Figure 1:
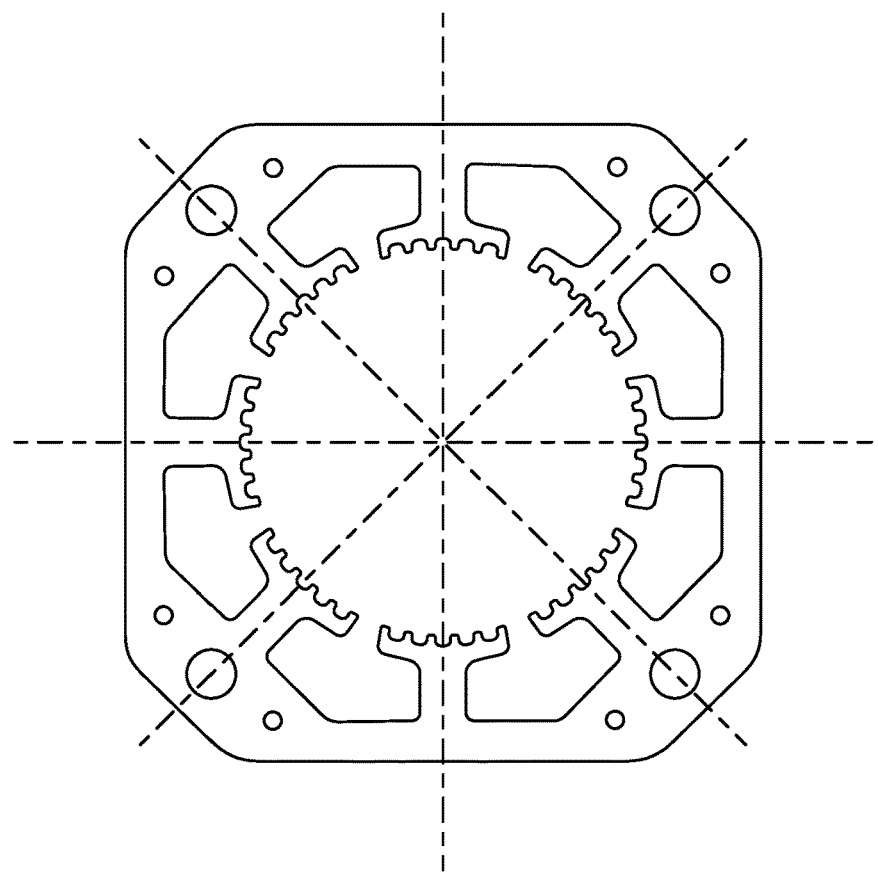
FIG. 1 is a plan view of a stator core of the prior art.
Figure 2:
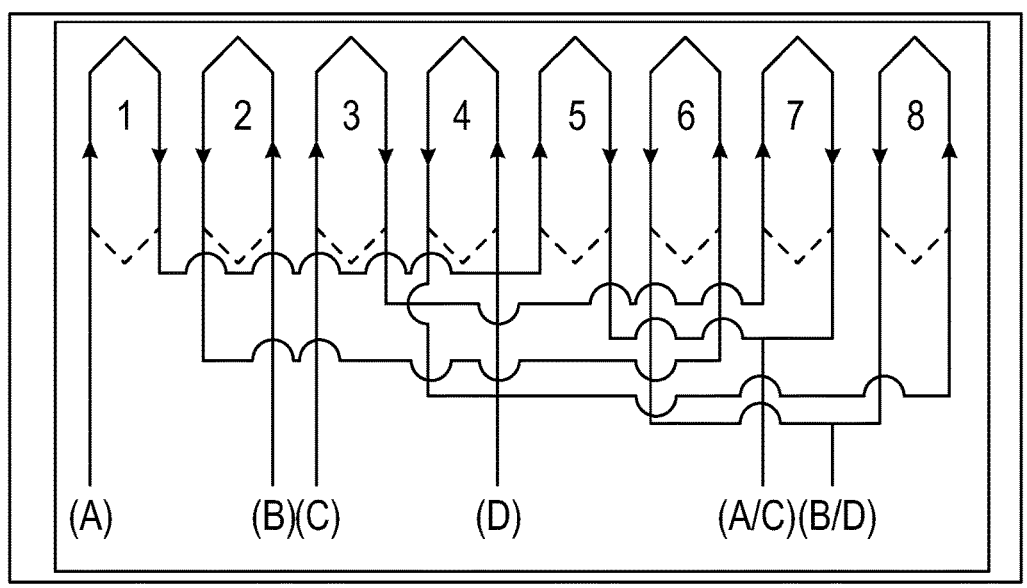
FIG. 2 is a diagram of a typical stator phase winding pattern of the prior art.
Figure 5:
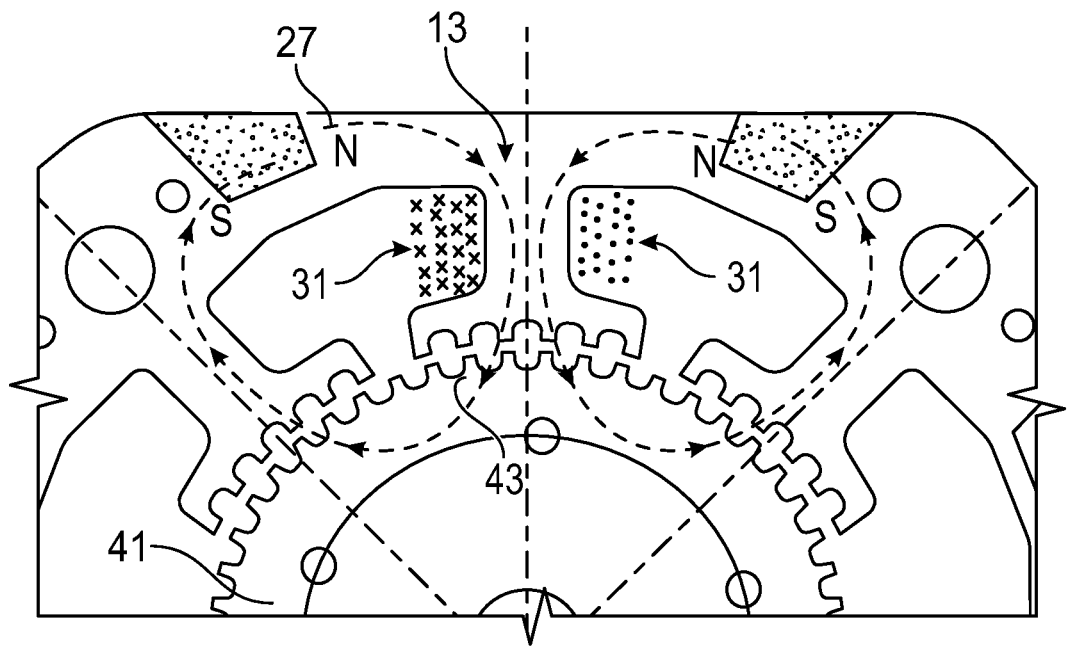
FIG. 5 is a partial close-up view of a VR stepper with the stator core of FIG. 3 and energized in a one-phase ON condition.

FIG. 5 shows magnetic flux paths 27 after some of the windings 31 are energized. This illustrates the one-phase ON condition. The windings 31 about the stator poles can be in any suitable winding configuration that is known in the prior art, such as that shown in FIG. 2. The magnet-bar (19 in FIG. 4) inserted into each slot 17, despite its remote location relative to the rotor is still close to the stator poles 13 and its windings 31, which are immediately adjacent to the magnet-bar 19 in the winding volume between the stator poles.

Adjacent permanent magnets around the yoke circumference have alternating opposed magnetic N-S polarization directions. That is, N poles from adjacent permanent magnet inserts point to stator poles that will coincide with the same N-S magnetic flux direction when energized. Likewise, for S poles pointing to other stator poles, the stators (when energized) being alternately N or S in polarization direction.

Hence, the permanent bar magnet 19 helps to change the magnetic flux of the energized Ampere Turns from the stator 11 with a much faster switching rate than a standard VR stepper. The central rotor 41 is seen to be part of the flux path 27. The permanent magnet flux 27 will be collected by the energized stator pole 13 through the air gap 43 to improve the holding torque. The torque generated by this energized flux is called "Holding Torque".

Figure 6:
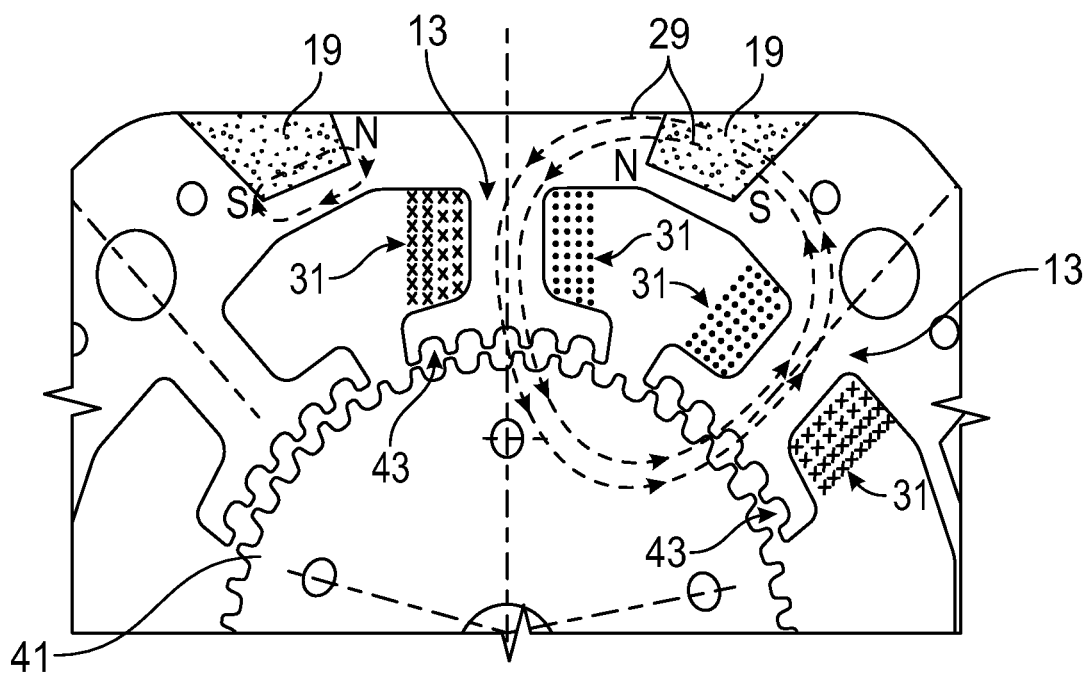
FIG. 6 is a partial close-up view of a VR stepper with the stator core of FIG. 3 and energized in a two-phase ON condition.

FIG. 6 shows magnetic flux paths 29 after the windings 31 are energized for the two-phase ON condition.

The central rotor 41 is again seen to be part of the flux path 29. The permanent magnet flux 29 will be collected by the energized stator poles 13 through the air gap 43 to improve the holding torque. Again, the torque generated by this energized flux is called "Holding Torque".

Figure 7A:
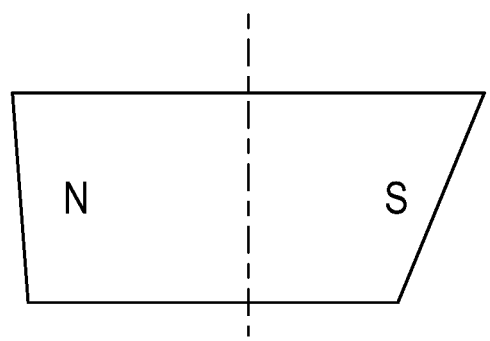
FIGS. 7A and 7B are respective end and sectional views of a permanent magnet insert in accord with the present invention.
Figure 7B:
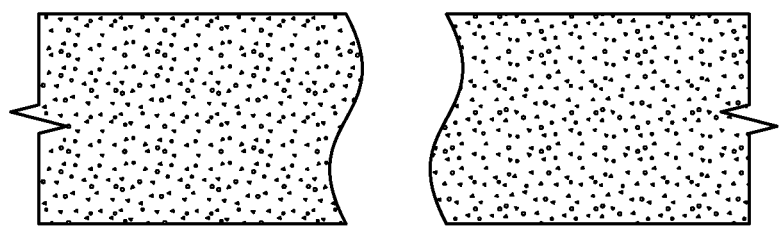
Figure 8:
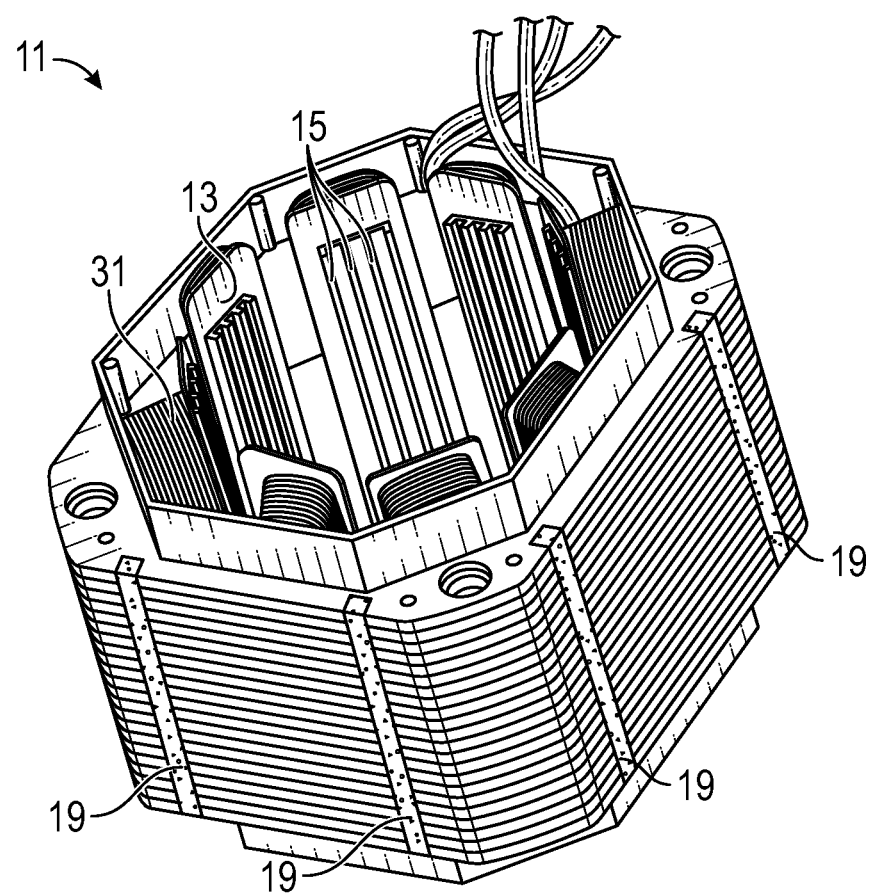
FIG. 8 is a perspective view of a stator for a VR motor in accord with present invention showing permanent bar magnets inserted into edge slots of the stator's back iron or outer yoke.

FIGS. 7A and 7B show a design of the permanent magnet piece 19 to fit into the slots for a size 42 mm square, 1.8-degree stepper with the stator length=21.8 mm. As seen in FIG. 8, the bar magnets 19 fit into the perimeter edge slots of the stator 11. The stator poles 13 with stator teeth 15 and phase windings 31 can also be seen. The stator 11 is a laminated structure of stacked plates, with edge slots in each plate being aligned to form the slots in the outer perimeter edge of the yoke and with the permanent magnets 19 being bar magnets extending axially across the stacked plates in the laminated structure. The magnet pieces 19 may extend the entire axial length of the stator across the lamination plates. A rotor (not seen) can fit within the center volume of the stator 11 to complete the motor.

The enhanced VR stepper gains 20% more of the holding torque than the standard VR stepper, while maintaining exceptionally low detent torque. The invention maximizes the (holding torque) to (detent torque) ratio to provide a higher speed operation with smooth motion in motion control devices. The standard hybrid stepper has a ratio around 33, while in the present enhanced VR stepper invention the ratio can be up to 200 (a six-fold improvement). The low detent torque is a direct result of the remote placement of the permanent bar magnets in the stator core's back iron.

Although the absolute holding torque achievable by the enhanced VR stepper is still lower than the holding torque of a hybrid stepper, the high-speed (>30 RPS) dynamic torque of the enhanced VR stepper is better than a hybrid stepper. "High speed torque" is also referred to as "dynamic torque" or "pullout torque" and applies to the torque generated while running at stepping speeds more than 30 rotations per second. This improvement is achieved through the permanent magnet flux being collected by the energized Ampere turns of the stator pole phase windings, which allows faster switching speeds for the energizing of the sequence of stator poles.

What is claimed is:

1. A variable reluctance stepper motor, comprising:
   a stator comprising an annular outer yoke with a set of circumferentially spaced stator poles extending radially inward from first portions of the outer yoke toward the rotor, and having a set of energizable conductive phase windings around each of the stator poles, wherein second portions of the annular outer yoke at locations circumferentially between the first portions have slots formed in an outer perimeter edge of the yoke with a permanent magnet embedded within each slot such that a magnetic orientation of the respective permanent magnets are circumferentially directed toward the first portions of the annular outer yoke from which the stator poles project, the number of slots and embedded magnets within the slots being equal to the number of stator Doles, adjacent permanent magnets around the yoke circumference have alternating opposed magnetic N-S polarization directions; and
   a rotor rotatable relative to the stator, the rotor composed of soft magnetic material and having a set of circumferentially evenly spaced rotor poles extending radially outward toward the stator.

2. The stepper motor as in claim 1 comprising a three-phase stepper with 3·n stator poles and 3·n slots in the outer yoke between stator poles, where n is an integer equal to or greater than two.

3. The stepper motor as in claim 1 comprising a four-phase stepper with 4·m stator poles and 4·n slots in the outer yoke between stator poles, where n is an integer equal to or greater than two.

4. The stepper motor as in claim 1, wherein the stator is a laminated structure of stacked plates, with edge slots in each plate being aligned to form the slots in the outer perimeter edge of the yoke and with the permanent magnets being bar magnets extending axially across the stacked plates in the laminated structure.

5. The stepper motor as in claim 1, wherein slots in the yoke leave a thin connecting strip of yoke material at an inner edge of the yoke immediately adjacent to a winding volume between the stator poles.

6. The stepper motor as in claim 5, wherein the connecting strip of yoke material has a radially thickness of at least 1 millimeter.

7. The stepper motor as in claim 1, wherein stator poles terminate in stator shoes having circumferentially spaced stator teeth adjacent to the rotor with an air gap therebetween.

8. A variable reluctance stepper motor, comprising:
   a rotor comprising multiple circumferentially, evenly spaced rotor poles extending outward from a central rotational axis; and
   a stator comprising an annular yoke with multiple circumferentially spaced stator poles at equal angular intervals around the yoke extending inward toward the rotor, and with stator phase windings individually coiled about the respective stator poles, the annular yoke further having multiple slots formed in an outer perimeter edge at locations situated circumferentially between the stator poles, each slot having an embedded permanent magnet with a circumferential magnetic orientation, wherein the number of slots with embedded permanent magnets in the outer perimeter edge equals the number of stator poles and the embedded permanent magnets have alternating opposed magnetic orientations around the yoke, the circumferential magnetic orientation of each permanent magnet being in a direction that coincides with the magnetic flux in stator poles when stator phase windings are energized.

9. The stepper motor as in claim 8, wherein the stator has a laminar structure with a stack of plates forming the annular yoke and stator poles, slots in the outer perimeter edge of each plate being aligned to form the slots around the circumference of the stator, the embedded permanent magnets being bar magnets extending axially across the stacked plates of the laminar structure.

10. The stepper motor as in claim 8, wherein the slots and embedded permanent magnets being are situated immediately adjacent and radially outward from winding volume spaces between the stator poles with narrow connecting strips of yoke material between the slots and winding volume spaces.

11. The stepper motor as in claim 8, wherein there are eight stator poles spaced at 45° circumferential intervals.

12. The stepper motor as in claim 8, wherein the slots and embedded magnets have a radial thickness of at least one millimeter and a circumferential dimension of at least two millimeters.

* * * * *